(12) United States Patent
Karlsson et al.

(10) Patent No.: US 11,068,251 B2
(45) Date of Patent: Jul. 20, 2021

(54) METHOD FOR DISTRIBUTING SOFTWARE UPGRADE IN A COMMUNICATION NETWORK

(71) Applicant: LumenRadio AB, Gothenburg (SE)

(72) Inventors: Michael Karlsson, Kode (SE); Lars Fabian Paape, London (GB); Marcus Bengtsson, Los Angeles, CA (US)

(73) Assignee: LumenRadio AB, Gothenburg (SE)

( * ) Notice: Subject to any disclaimer, the term of this patent is extended or adjusted under 35 U.S.C. 154(b) by 0 days.

(21) Appl. No.: 16/087,996

(22) PCT Filed: Apr. 4, 2017

(86) PCT No.: PCT/SE2017/050332
§ 371 (c)(1),
(2) Date: Sep. 24, 2018

(87) PCT Pub. No.: WO2017/176197
PCT Pub. Date: Oct. 12, 2017

(65) Prior Publication Data
US 2019/0095190 A1 Mar. 28, 2019

(30) Foreign Application Priority Data
Apr. 4, 2016 (SE) .................... 1650450-8

(51) Int. Cl.
*G06F 9/44* (2018.01)
*G06F 8/65* (2018.01)
(Continued)

(52) U.S. Cl.
CPC .................. *G06F 8/65* (2013.01); *G06F 8/60* (2013.01); *H04L 67/34* (2013.01)

(58) Field of Classification Search
CPC .............. G06F 8/65; G06F 8/60; H04L 67/34
See application file for complete search history.

(56) References Cited

U.S. PATENT DOCUMENTS 8,910,141 B2   12/2014  Bahls et al.
2003/0177485 A1*  9/2003  Waldin, Jr. ................ G06F 8/64
                                                          717/169
(Continued)

FOREIGN PATENT DOCUMENTS

EP        2581827 A1    4/2013

*Primary Examiner* — Hang Pan
(74) *Attorney, Agent, or Firm* — Capitol City TechLaw

(57) ABSTRACT

The present invention relates to a method for distributing software upgrade in a communication network (30). The communication network comprises a plurality of nodes ($N_1$-$N_5$) and each node is configured to execute a node specific version of software and is configured to communicate with one or more neighbouring nodes. The method comprises storing (51), on each node, software upgrade information used to upgrade software to the node specific version of the software executed on each node, the software upgrade information comprises patch files for all versions of the software previously executed on each node; transmitting (52) from a first node, to neighbouring nodes, version information representing the node specific version currently executed on the first node; comparing (53) the node specific version currently executed on the first node with the node specific version of the software executed on each of the neighbouring nodes; and receiving (55), in the first node, software upgrade information from each neighbouring node when the node specific version currently executed on the first node represents an older version of the software executed on the neighbouring node, wherein the software upgrade information comprises at least one additional patch file to upgrade the node specific version currently executed on the first node.

8 Claims, 3 Drawing Sheets

(51) Int. Cl.
  *G06F 8/60*    (2018.01)
  *H04L 29/08*   (2006.01)

(56) References Cited

U.S. PATENT DOCUMENTS

| | | | |
|---|---|---|---|
| 2008/0133650 A1* | 6/2008 | Saarimaki | G06F 8/65 709/203 |
| 2008/0301671 A1 | 12/2008 | Kim | |
| 2011/0047438 A1 | 2/2011 | Chung et al. | |
| 2011/0047538 A1 | 2/2011 | Chung et al. | |
| 2011/0106886 A1* | 5/2011 | Nolterieke | G06F 8/65 709/204 |
| 2012/0102477 A1* | 4/2012 | Kim | G06F 8/654 717/169 |
| 2013/0139140 A1 | 5/2013 | Rao et al. | |
| 2014/0068587 A1 | 3/2014 | Krishna | |
| 2014/0123123 A1 | 5/2014 | Bahls | |
| 2015/0331688 A1* | 11/2015 | Shimizu | G06F 8/654 717/170 |
| 2016/0080198 A1* | 3/2016 | Liu | H04W 24/02 370/338 |

* cited by examiner

METHOD FOR DISTRIBUTING SOFTWARE UPGRADE IN A COMMUNICATION NETWORK

This application claims priority under 35 USC 119(a)-(d) to SE patent application No. 1650450-8 filed Apr. 4, 2016, the entire content of which is incorporated herein by reference.

TECHNICAL FIELD

The present disclosure relates to a method for distributing software upgrade in a communication system using patch files, and a node in a communication system.

BACKGROUND

Upgrading software integrated in hardware (i.e. firmware) has to be performed carefully in order not to create a situation where different branches of the network cannot communicate with each other due to different versions of the firmware.

This problem is addressed by U.S. Pat. No. 8,910,141, where the network is arranged in a tree structure and a centralized upgrading process is used to make sure that the firmware of each node in the network is upgraded. However, when implementing the disclosed method in other types of networks, such as meshed network, problems may arise with conflicting versions of firmware in nodes.

This problem is addresses in US 2014/0123123 A1, wherein software distribution in a wireless meshed network is disclosed. Every node in the network performs a report cycle in which the node transmits a report containing type and software version to neighbouring nodes. If one of the neighbouring nodes has a newer version of the software executed in the reporting node, this information is transmitted to the reporting node to upgrade the software to the newer version.

If the network comprises many types of nodes using different software, then each node has to contain a large number of software versions (one for each type of software used in the network) to make the comparison in order to determine if there is a newer version of the type of software for a particular node. Furthermore, a version dependent software upgrade may be required since not all older versions may be upgraded to the newer version using the same software upgrade. Thus, a large software upgrade storage is required.

Therefore, there is a need to develop an improved method for upgrading firmware.

SUMMARY

An object of the present disclosure is to provide a method which seeks to eliminate the risk for having conflicting versions of firmware in nodes belonging to a communication network and to provide a node.

This object is obtained by a method for distributing software upgrade in a communication network 30. The communication network comprises a plurality of nodes $N_1$-$N_5$, each node executing a node specific version of a software and is further configured to communicate with one or more neighbouring nodes. The method comprises:

a) storing 51, on each node, software upgrade information used to upgrade software to the node specific version of the software executed on each node, the software upgrade information comprises patch files for all versions of the software previously executed on each node, b) transmitting 52 from a first node, to the one or more neighbouring nodes, version information representing the node specific version currently executed on the first node, c) comparing 53 the node specific version currently executed on the first node with the node specific version of the software executed on each of the one or more neighbouring nodes, and d) receiving 55, in the first node, software upgrade information from each neighbouring node when the node specific version currently executed on the first node represents an older version of the software executed on the neighbouring node, wherein the software upgrade information comprises at least one additional patch file to upgrade the node specific version currently executed on the first node.

An advantage with the present invention is that upgrading information required to upgrade the software executed on the node may be stored in each node without requiring a large storage capacity.

Further advantages and aspects of the invention may be found in the specification.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
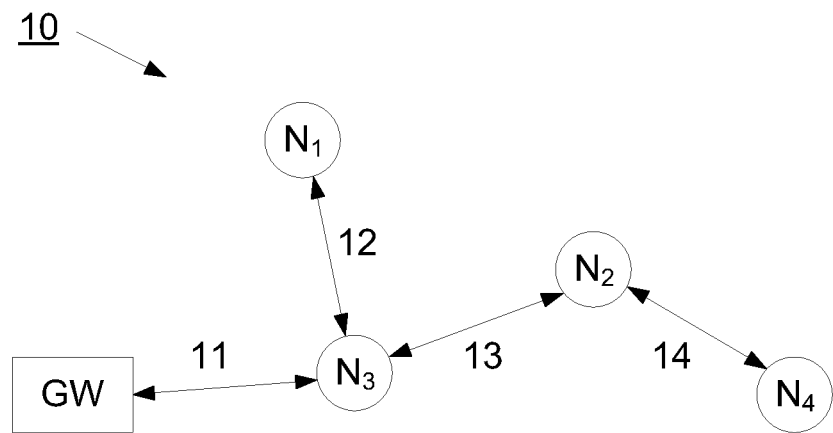
FIG. 1 illustrates a communication network with a tree structure.

Aspects of the present disclosure will be described more fully hereinafter with reference to the accompanying drawings. The communication network and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Some of the example embodiments presented herein are directed towards a communication system having a plurality of nodes. As part of the development of the example embodiments presented herein, a problem will first be identified and discussed.

FIG. 1 shows a communication system 10 with multiple nodes $N_i$, which in this example has four nodes $N_1$-$N_4$ and a gateway GW. Each node is provided with firmware (software executed on each node) with a node specific version of the software. The firmware is configured to communicate with one or more nodes and to perform predetermined duties assigned to the node, such as controlling lighting, measuring temperature, etc.

According to prior art, the firmware may be upgraded in response to a request from the gateway GW, which in this example communicates with node $N_3$ as indicated by 11, and the firmware of node $N_3$ is upgraded. Node $N_3$ is configured to communicate with node $N_1$ and node $N_2$, as indicated by 12 and 13 respectively, and when nodes $N_1$ and $N_2$ are aware of a newer version of the software currently executed in the nodes, the new version of the software is downloaded and the firmware is upgraded. The same applies for node $N_4$, which communicates with node $N_2$, as indicated by 14, and its firmware is upgraded when a new version of the software is available for downloading from node $N_2$.

When upgrading firmware according to the prior art, it is essential that the tree-structure is maintained during the upgrading process. Furthermore, the communication network may be a wired or wireless network, or a combination of both.

Figure 2:
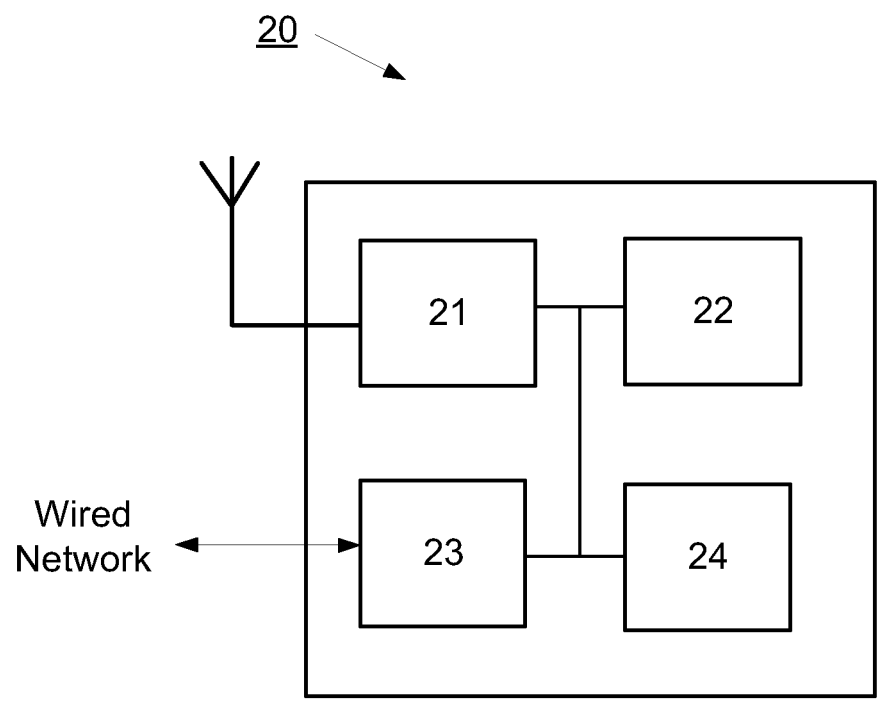
FIG. 2 illustrates a block diagram of an example node.

FIG. 2 illustrates an example of a node 20 which may incorporate some of the example embodiments discussed in the specification. As shown in FIG. 2, the node may comprise a radio circuitry 21 configured to receive and transmit any form of communications or control signals within a network. It should be appreciated that the radio circuitry 21 may be comprised as any number of transceiving, receiving, and/or transmitting units or circuitry. It should further be appreciated that the radio circuitry 21 may be in the form of any input/output communications port known in the art. The radio circuitry 21 may comprise RF circuitry and baseband processing circuitry (not shown).

The node 20 may further comprise at least one memory unit or circuitry 22 that may be in communication with the radio circuitry 21. The memory 22 may be configured to store received or transmitted data and/or executable program instructions. The memory 22 may also be configured to store any form of measured data or information obtained as a part of the defined node functionalities. The memory 22 may be any suitable type of computer readable memory and may be of volatile and/or non-volatile type.

The node 20 may further comprise a network interface 23 and processing circuitry 24 which may be configured to execute software stored in the memory 22. The processing circuitry 24 may be any suitable type of computation unit, e.g. a microprocessor, digital signal processor (DSP), field programmable gate array (FPGA), or application specific integrated circuit (ASIC) or any other form of circuitry. It should be appreciated that the processing circuitry need not be provided as a single unit but may be provided as any number of units or circuitry.

Figure 3:
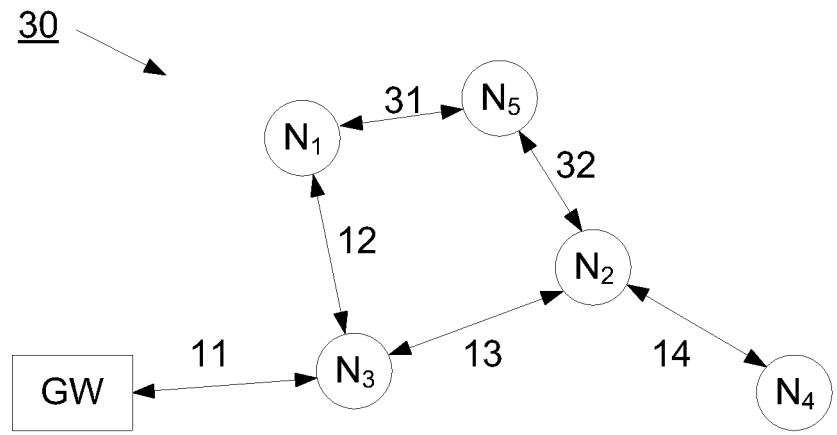
FIG. 3 illustrates a meshed communication network.

FIG. 3 illustrates a meshed communication network 30, similar to the network described in connection with FIG. 1 with the exception of an additional node $N_5$ which is configured to communicate with nodes $N_1$ and $N_2$, as indicated by 31 and 32, thereby creating a meshed network. The additional node $N_5$ may be provided with a later version of the software executed on the node, and the nodes may be configured to automatically upgrade the firmware, i.e. the software integrated in the hardware and executed in each node, when a newer version of the software is detected.

Each node may transmit version information (in each transmission or at regular intervals after a predetermined time delay) to neighbouring nodes to investigate if a newer version of the software executed on the node is available. This process is described in more detail in connection with FIGS. 4 and 5.

Figure 4:
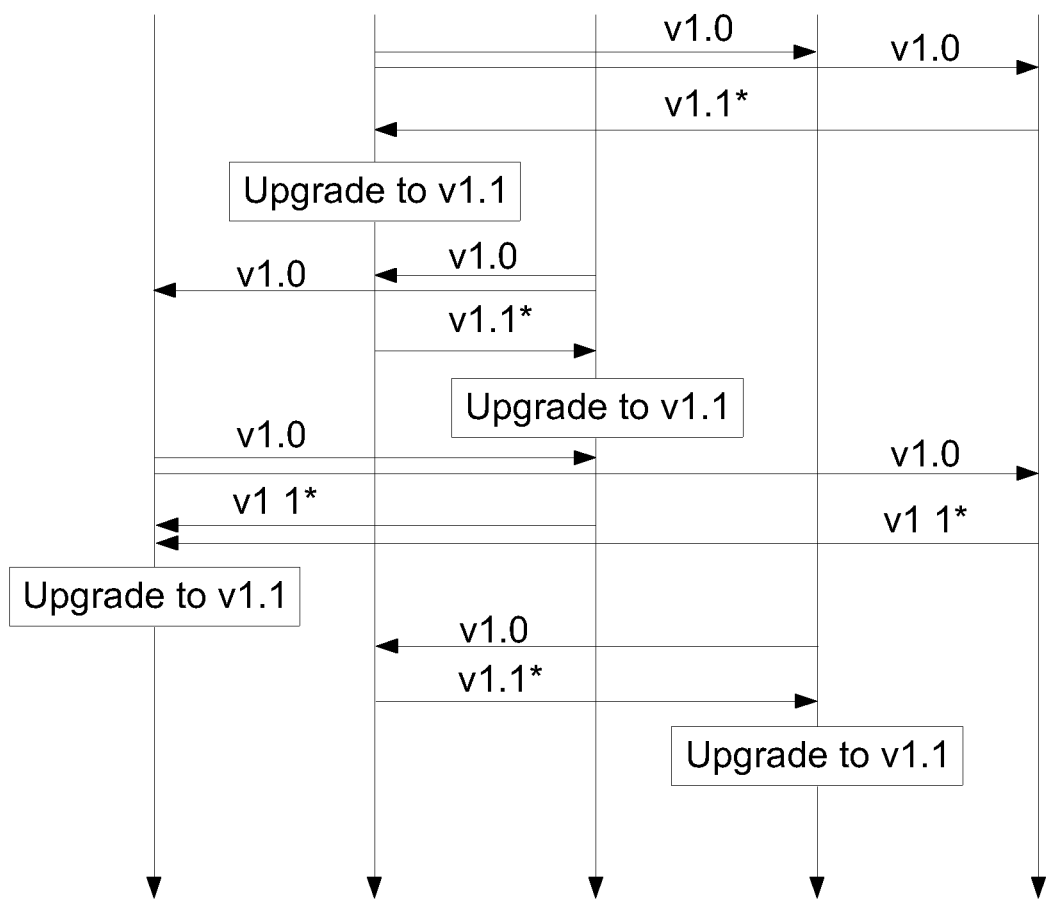
FIG. 4 is a signalling diagram illustrating an exchange of signals in a communication network.

FIG. 4 is a signalling diagram 40 illustrating an exchange of signals in a communication network. Each node $N_1$-$N_5$ is indicated with the current version of the software executed on each node, e.g. node $N_1$ executes version v1.0 and node $N_5$ executes version v1.1. Each node has a memory in which software upgrade information is stored.

In this example, node $N_2$ transmits version information v1.0 to neighbouring nodes $N_4$ and $N_5$ and if there is a newer version of the software available in any of these nodes, software upgrade information is transmitted back to the requesting node $N_2$. In this example, node $N_4$ executes the same software version as node $N_2$ and therefore, no message is transmitted back to node $N_2$. However, node $N_5$ has a newer version of the software available v1.1, and therefore transmits software upgrade information v1.1* (indicated with an asterisk since upgrading using the software upgrade information v1.1* will result in a new version of the software v1.1 intended to be executed on the node).

Node $N_2$ receives the software upgrade information and upgrades the software and stores the software upgrade information in the node memory. Next node $N_3$ transmits its version information v1.0 to neighbouring nodes $N_1$ and $N_2$ and receives software upgrade information v1.1* from node $N_2$ and upgrades the software to v1.1. Thereafter, node $N_1$ transmits its version information v1.0 to neighbouring nodes $N_3$ and $N_5$ and receives software upgrade information v1.1* both from node $N_3$ and node $N_5$, and upgrades the software to v1.1. Finally, node $N_4$ transmits its version information v1.0 to neighbouring node $N_2$ and receives software upgrade information v1.1* from node $N_2$ and upgrades the software to v1.1.

The additional node $N_5$ may initially transmit its version information when introduced into the network, to ensure that the software executed on node $N_5$ is not outdated. However, in this example, node $N_5$ had a newer version of the software and thus may not receive any software upgrade information from any other node in the network.

Figure 5:
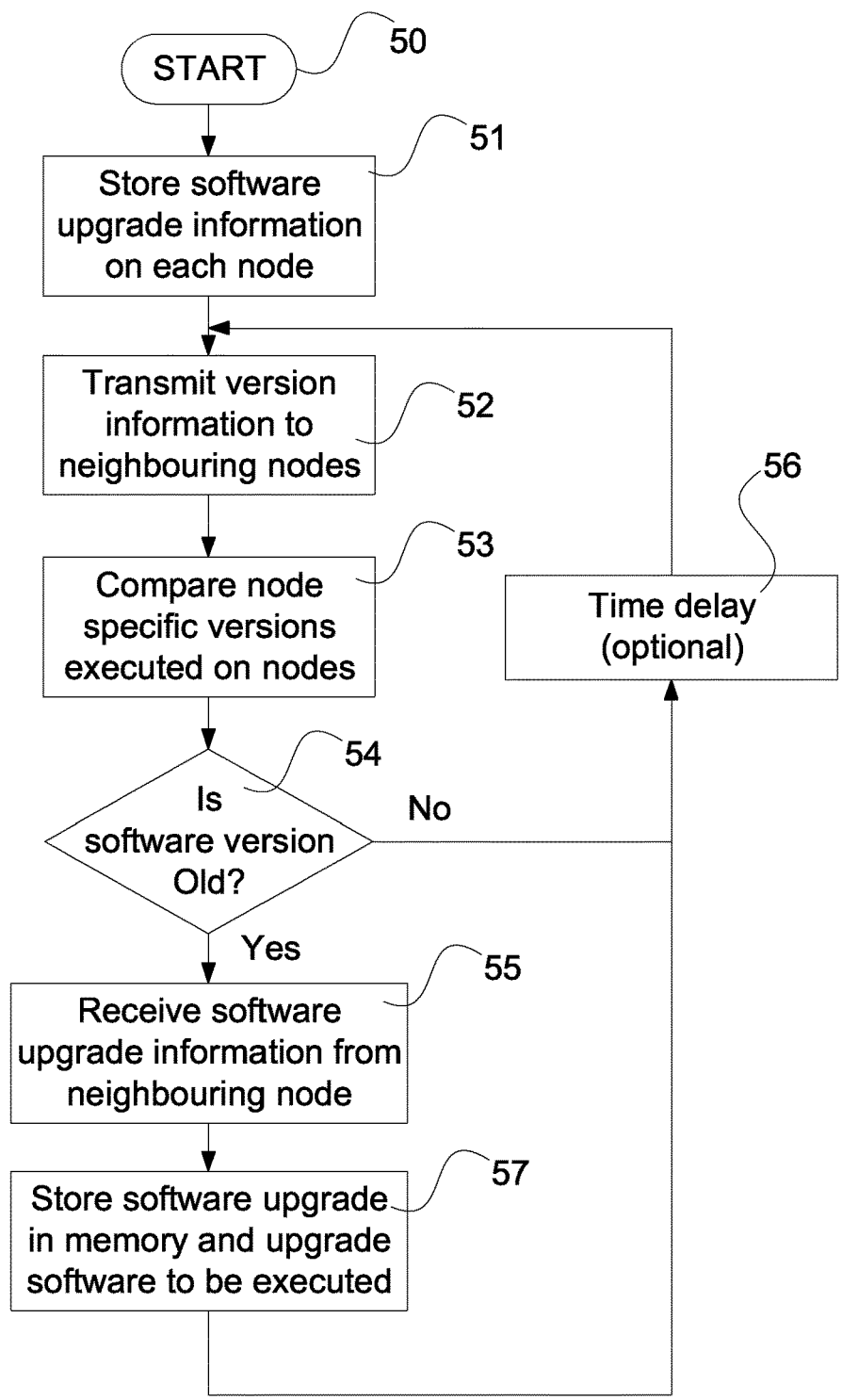
FIG. 5 is a flowchart illustrating embodiments of method steps.

FIG. 5 is a flowchart illustrating embodiments of a method for distributing software upgrade in a communication network. The communication network comprising a plurality of nodes, each node executing a node specific version of a software and each node is further configured to communicate with one or more neighbouring nodes.

The flow starts in 50, and in step 51, software upgrade information used to upgrade software to the node specific version of the software executed on each node is stored on each node.

Version information is transmitted from a first node to one or more neighbouring nodes, as indicated in step 52. The version information represents the node specific version currently executed on the first node.

The node specific version currently executed on the first node is compared, step 53, with the node specific version of the software executed on each of the neighbouring nodes, and a decision is made, step 54, to transmit software upgrade information from each neighbouring node when the node specific version currently executed on the first node represents an older version of the software executed on the neighbouring node. The software upgrade information is received in the first node in step 55.

However, if the node specific version currently executed on the first node represents the same or newer version of the software executed on each neighbouring node, the flow is fed back to step 52 via an optional step 56 including a time delay. The time delay is used to regulate how often each node investigates the current status of the version currently executed on the node.

The time delay is predetermined for each node and may be any suitable time, such as 10 seconds, 2 hours, 4 days, etc., and step 56 includes waiting the predetermined time before the flow is fed back to step 52.

When the first node has received the software upgrade information from one or more neighbouring nodes, the software to be executed on the first node is upgraded based on the received upgrade information and the upgrade information is stored on the first node, step 57. The flow is thereafter fed back to step 52 via the optional time delay step 56.

The software upgrade information may be a complete installation file, or the software upgrade information may be a patch file. If the software upgrade information is a patch file it may be necessary to have access to previous patch files to upgrade the software to the latest version, and thus the method may further comprise modifying step 52 to store software upgrade information to all versions of the software previously executed on each node.

When patch files are used, the method may also comprise selecting, in the first node, a version specific patch file based on the version information, and upgrading the software in step 57 using the version specific patch file.

Furthermore, step 53 may further comprise selecting, in each neighbouring node, a version specific patch file to be transmitted to the first node based on the received version information.

In one embodiment, the software upgrade information received in the first node may comprise patch files for all newer versions of the software currently executed on the first node, and the method may further comprise storing the received patch files on the first node. A complete set of patch files for all newer versions of the software is transmitted to the first node. This will require a larger memory to hold the information, but on the other hand the information may be useful when upgrading other nodes communication with the first node in the future.

In another embodiment, the software upgrade information received in the first node may comprise only one patch file for a newer version of the software currently executed on the first node, and the method may further comprises storing the received patch files on the first node. This will reduce the need for a large memory and limit the amount of upgrade information that needs to be communicated between the nodes. However, it will limit the options available when updating another node communicating with the first node.

The basic version of the software executed on a node is typically around 100 kB in size, and when upgrading the software, a complete version of the software will be larger in size, typically 104-120 kB. If the upgrade information is distributed using patch files, the size of the patch files will be 4-20 kB in size. This will reduce the necessary storage capacity in each node, and a smaller and less expensive memory may be used.

One aspect of the disclosure is a node in a communication network comprising a plurality of nodes $N_i$, each node is configured to execute a node specific version of a software and is configured to communicate with one or more neighbouring nodes. The node may be configured:

a) to store software upgrade information used to upgrade software to the node specific version of the software executed on the node, the software upgrade information comprises patch files for all versions of the software previously executed on each node, b) to receive from the one or more neighbouring nodes, version information representing the node specific version currently executed on each of the one or more neighbouring nodes, c) to compare the node specific version currently executed on the node with the node specific version of the software executed on each of the one or more neighbouring nodes, and d) to transmit software upgrade information to each neighbouring node when the node specific version currently executed on the node represents a newer version of the software executed on the neighbouring node, wherein the software upgrade information comprises at least one additional patch file to upgrade the node specific version currently executed on the node.

In addition, the node may further be configured to perform the following as part of item d):

d1) to upgrade, when software upgrade information is received from the neighbouring node, the software to be executed on the node based on the received upgrade information and to store the upgrade information on the node.

Another aspect of the disclosure is a node in a communication network comprising a plurality of nodes $N_i$, each node is configured to execute a node specific version of a software and is configured to communicate with one or more neighbouring nodes. In this embodiment, the node may be configured:

to store software upgrade information used to upgrade software to the node specific version of the software executed on the node, said software upgrade information comprises patch files for all versions of the software previously executed on each node, to receive from said one or more neighbouring nodes, version information representing the node specific version currently executed on each of the one or more neighbouring nodes, to compare said node specific version currently executed on the node with the node specific version of the software executed on each of said one or more neighbouring nodes, and to receive software upgrade information from each neighbouring node when the node specific version currently executed on the node represents an older version of the software executed on the neighbouring node, wherein the software upgrade information comprises at least one additional patch file to upgrade the node specific version currently executed on the node.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method for distributing a software upgrade in a meshed communication network that includes a plurality of nodes, each node is configured to execute a node specific version of a software and is configured to communicate with one or more neighbouring nodes, the method comprising:
   a) storing, on each node, software upgrade information used to upgrade software to the node specific version of the software executed on each node, the software upgrade information including patch files for all versions of the software previously executed on each node;
   b) transmitting from a first node, to the one or more neighbouring nodes, version information representing the node specific version currently executed on the first node;
   c) comparing the node specific version currently executed on the first node with the node specific version of the software executed on each of the one or more neighbouring nodes; and
   d) receiving, in the first node, software upgrade information from each neighbouring node when the node specific version currently executed on the first node represents an older version of the software executed on the neighbouring node, wherein the software upgrade information includes at least one additional patch file to upgrade the node specific version currently executed on the first node, wherein the at least one additional patch file is a version specific patch file;
   d1) upgrading, when software upgrade information is received from the neighbouring node, the software to be executed on the first node based on the received upgrade information and storing the upgrade information on the first node;
   wherein the method further comprises selecting, in the first node, a version specific patch file based on the version information, and upgrading the software in step d1) using the version specific patch file.

2. The method according to claim 1, wherein step c) further comprises selecting, in each neighbouring node, the version specific patch file to be transmitted to the first node based on the received version information.

3. The method according to claim 1, wherein the software upgrade information received in the first node includes patch files for all newer versions of the software currently executed on the first node; and
   wherein the method further comprises storing the received patch files on the first node.

4. The method according to claim 1, wherein the software upgrade information received in the first node includes only one patch file for a newer version of the software currently executed on the first node; and
   wherein the method further comprises storing the received patch file on the first node.

5. The method according to claim 1, wherein the communication network is a wireless network.

6. A node in a meshed communication network that includes a plurality of nodes, each node is configured to execute a node specific version of a software and is configured to communicate with one or more neighbouring nodes;
   wherein the node comprises at least a processor;
   wherein the node is further configured:
   a) to store software upgrade information used to upgrade software to the node specific version of the software executed on the node, the software upgrade information including patch files for all versions of the software previously executed on each node;
   b) to transmit to the one or more neighbouring nodes, version information representing the node specific version currently executed on the node;
   c) to compare the node specific version currently executed on the node with the node specific version of the software executed on each of the one or more neighbouring nodes; and
   d) to receive software upgrade information from each neighbouring node when the node specific version currently executed on the node represents an older version of the software executed on the neighbouring node, wherein the software upgrade information includes at least one additional patch file to upgrade the node specific version currently executed on the node, wherein the at least one additional patch file is a version specific patch file;

wherein the node is further configured to perform the following as part of item d):

d1) to upgrade, when software upgrade information is received from the neighbouring node, the software to be executed on the node based on the received upgrade information and to store the upgrade information on the node;

wherein the node is further configured to select a version specific patch file based on the version information, and upgrading the software in step d1) using the version specific patch file.

7. A node in a meshed communication network that includes a plurality of nodes, each node is configured to execute a node specific version of a software and is configured to communicate with one or more neighbouring nodes;

wherein the node comprises at least a processor;

wherein the node is further configured:

a) to store software upgrade information used to upgrade software to the node specific version of the software executed on the node, the software upgrade information including patch files for all versions of the software previously executed on each node;

b) to receive from the one or more neighbouring nodes, version information representing the node specific version currently executed on each of the one or more neighbouring nodes;

c) to compare the node specific version currently executed on the node with the node specific version of the software executed on each of the one or more neighbouring nodes; and d) to transmit software upgrade information to each neighbouring node when the node specific version currently executed on the node represents a newer version of the software executed on the neighbouring node, wherein the software upgrade information includes at least one additional patch file to upgrade the node specific version currently executed on the node, wherein the at least one additional patch file is a version specific patch file;

wherein the node is further configured to perform the following as part of item d):

d1) to upgrade, when software upgrade information is received from the neighbouring node, the software to be executed on the node based on the received upgrade information and to store the upgrade information on the node;

wherein the node is further configured to select a version specific patch file based on the version information, and upgrading the software in step d1) using the version specific patch file.

8. A node in a meshed communication network that includes a plurality of nodes, each node is configured to execute a node specific version of a software and is configured to communicate with one or more neighbouring nodes;

wherein the node comprises at least a processor;

wherein the node is further configured:

to store software upgrade information used to upgrade software to the node specific version of the software executed on the node, the software upgrade information including patch files for all versions of the software previously executed on each node;

to receive from the one or more neighbouring nodes, version information representing the node specific version currently executed on each of the one or more neighbouring nodes;

to compare the node specific version currently executed on the node with the node specific version of the software executed on each of the one or more neighbouring nodes; and to receive software upgrade information from each neighbouring node when the node specific version currently executed on the node represents an older version of the software executed on the neighbouring node, wherein the software upgrade information includes at least one additional patch file to upgrade the node specific version currently executed on the node, wherein the at least one additional patch file is a version specific patch file;

wherein the node is further configured to perform the following as part of item d):

d1) to upgrade, when software upgrade information is received from the neighbouring node, the software to be executed on the node based on the received upgrade information and to store the upgrade information on the node;

wherein the node is further configured to select a version specific patch files based on the version information, and upgrading the software in step d1) using the version specific patch file.

* * * * *